United States Patent [19]

Freund et al.

[11] Patent Number: 4,554,060

[45] Date of Patent: Nov. 19, 1985

[54] PHOTOLYTIC SEPARATION OF ISOTOPES IN CRYOGENIC SOLUTION

[75] Inventors: Samuel M. Freund, Santa Fe; William B. Maier, II, Los Alamos; Redus F. Holland, Los Alamos; Willard H. Beattie, Los Alamos, all of N. Mex.

[73] Assignee: The United States of America as represented by the United States Department of Energy, Washington, D.C.

[21] Appl. No.: 69,151

[22] Filed: Aug. 23, 1979

[51] Int. Cl.[4] ............................................. B01D 59/00
[52] U.S. Cl. ............................................. 204/157.1 R
[58] Field of Search ................................. 204/157.1 R

[56] References Cited

U.S. PATENT DOCUMENTS

| | | | |
|---|---|---|---|
| 3,923,619 | 12/1975 | De Poorter et al. | 204/157.1 R |
| 4,213,836 | 7/1980 | Freund et al. | 204/157.1 R |
| 4,220,510 | 9/1980 | Brueck et al. | 204/157.1 R |

OTHER PUBLICATIONS

Loree et al., J. Photochem. 10, 359 (1979).
Freund et al., Analyt. Chem. 50, 1260 (1978).
Clark, R. J. H. et al Eds., *Advances in Infrared and Raman Spectroscopy* vol. II, 1976, p. 50.

Primary Examiner—Deborah L. Kyle
Assistant Examiner—Virginia Caress
Attorney, Agent, or Firm—Samuel M. Freund; Paul D. Gaetjens; Judson R. Hightower

[57] ABSTRACT

Separation of carbon isotopes by photolysis of $CS_2$ in cryogenic solutions of nitrogen, krypton and argon with 206 nm light from an iodine resonance lamp is reported. The spectral distribution of the ultraviolet absorption depends on solvent. Thus, in liquid nitrogen the photolytic decomposition rate of $^{13}CS_2$ is greater than that of $^{12}CS_2$ (because the absorption of 206 nm radiation is greater for $^{13}CS_2$), whereas in liquid krypton and liquid argon the reverse is true. The shift in ultraviolet spectrum is a general phenomenon readily characterized as a function of solvent polarizability, and exhibits behavior similar to that for vibrational transitions occurring in the infrared.

2 Claims, 5 Drawing Figures

PHOTOLYTIC SEPARATION OF ISOTOPES IN CRYOGENIC SOLUTION

BACKGROUND OF THE INVENTION

The invention described herein relates to a method for separating isotopes and more specifically to method wherein said isotopes are separated as a result of selective or preferential photochemical decomposition of the desired isotope bearing feedstock material in cryogenic solution. The necessary coincidence in wavelength between the light source emission and the absorption of said isotope bearing species is accomplished by choosing the appropriate cryogenic solvent and not by "tuning" the light source which is commonly done if said source can actually be adjusted in wavelength as can some lasers. Recent success in the separation of D from H in cryogenic solutions of formaldehyde has stimulated interest of the inventors in extending the technique to the separation of isotopes of other light elements. A concurrent vapor-phase isotope separation of carbon isotopes from the low-pressure photolysis of $CS_2$ with light from an ArF laser, the existence of predissociative states which give rise to well-defined vibronic structure in the region 185–215 nm, and the availability of a convenient and powerful resonance lamp photolysis source suggested to the inventors that $CS_2$ might be a suitable candidate for a liquid-phase separation. The modest success with this molecule at 206 nm described in detail below was made possible by the utilization of the shift in molecular absorption features resulting from dissolution of the feedstock material. $CS_2$, in cryogenic solvents, since convenient, high intensity, tunable uv sources in this region have not been developed, especially those with the advantages of continuous-wave operation. It is of importance to note that the iodine resonance lamp was selected because its output corresponds toa region of strong absorption by $CS_2$. Further, the inventors have discovered that the solvent shift is a general phenomenon and not restricted to $CS_2$ for a feedstock compound and carbon as the only relevant or possible isotopic species. The invention is a result of a contract with the Department of Energy.

Four publications are known to be relevant to the instant invention. The first, "Carbon and Sulfur Isotope Separation by ArF Laser Irradiation of $CS_2$," by Loree et al., J. Photochem. 10, 359 (1979), describes a vapor phase separation in which the laser is "tuned" into coincidence with an absorption feature of the desired carbon isotope containing $CS_2$ molecule. Although the photolysis products are almost certainly the same as those for the instant invention, and the process presented therein successful, the paper does not teach the obtaining of the desired coincidence between the light source and the absorptions of the $CS_2$ molecules containing the sought-after isotope by shifting the molecular spectrum of said molecules to coincide with a fixed wavelength light source by the use of cryogenic solvents.

Patent application Ser. No. 839,238 (Laser-Induced Separation of Hydrogen Isotopes in the Liquid Phase) teaches the cryogenic isotope separation technique of the instant invention but again does not disclose the use of the solvent shift of the molecular spectrum to obtain the required coincidence for isotopically selective photochemistry. The light sources therein described either produce radiation at a desired wavelength or can be "tuned" to such a wavelength.

The third publication, "Quantitative Detection of Trace Impurities in Gases by Infrared Spectrometry of Cryogenic Solutions" by Freund et al., Analyt. Chem. 50, 1260 (1978), discloses that there is indeed a shift in the molecular spectrum as a function of solvent, but neither characterizes said shift nor teaches a photochemical application made possible because of a coincidence becoming available as a result of said shift.

The final work, found in *Advances in Infrared and Raman Spectroscopy*, Vol. II (Ed. by R. J. H. Clark and R. E. Hester, Heyden, 1976), page 50 mentions the "fine tuning" of absorption frequencies of solutes by appropriate choice of the host in matrix isolation studies, but does not teach the corresponding effect in cryogenic solutions, nor its application to the separation of isotopes.

SUMMARY OF THE INVENTION

An object of the invention is the separation of isotopes by a photolytic process in cryogenic solution. In particular, the requisite coincidence between the photolysis light source and the molecular absorption of a particular isotopic species of an appropriate feedstock material is attained by a judicious choice of cryogenic solvent or a mixture of solvents which shifts the molecular spectrum of said isotopic species of said feedstock material in such a way that said coincidence can occur.

Other objects and novel features of the invention will become apparent to those skilled in the art upon examination of the following detailed description of a preferred embodiment of the invention and the accompanying drawings.

It has been demonstrated that photolysis of a dissolved isotope containing feedstock compound can significantly alter natural isotope ratios in a cryogenic solution. Molecular excitation is achieved by choosing a solvent or a mixture of solvents which shifts the absorption spectrum for a particular desired isotope in said feedstock compound to coincide with the emission of a fixed wavelength photolysis source. In particular, the photolytic separation of carbon isotopes in cryogenic solutions of $CS_2$ in nitrogen, krypton, and argon is obtained by using 206-nm light from an iodine resonance lamp. The ultraviolet absorption spectrum of carbon disulfide is different in different solvents, so that the photodestruction rates of $^{12}CS_2$ relative to $^{13}CS_2$ can easily be varied, such rates being proportional to the uv absorption in simple systems such as this. Depending upon which cryogenic solvent is used, either $^{12}CS_2$ or $^{13}CS_2$ can be made to photolyze more rapidly for a given wavelength of photolyzing radiation. Thus, in liquid nitrogen the photolytic rate of $^{13}CS_2$ is greater than that of $^{12}CS_2$, whereas in liquid krypton and liquid argon the reverse is true.

DESCRIPTION OF THE PREFERRED EMBODIMENT

Figure 1:
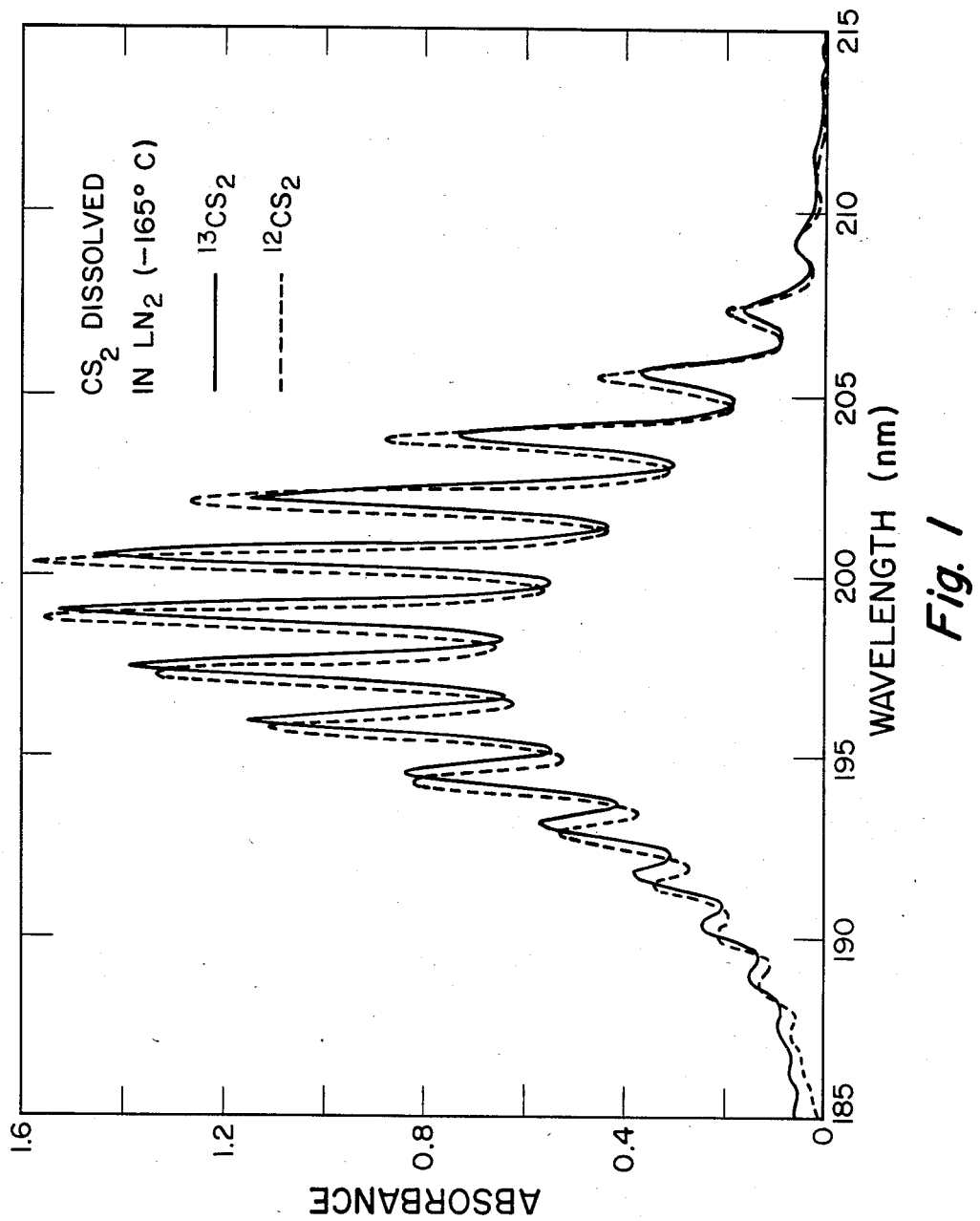
FIG. 1 shows curves of the ultraviolet spectra of $^{12}CS_2$ and $^{13}CS_2$ dissolved in liquid nitrogen at $-165°$ C.

The apparatus used for both spectroscopy and photochemistry experiments have been described in detail in "Photolytic Separation of D from H in Cryogenic Solutions of Formaldehyde" by William B. Maier II, Samuel M. Freund, Redus F. Holland, and Willard H. Beattie, J. Chem. Phys. 69, 1961 (1978). Ultraviolet absorption spectra were obtained with a Cary Model 17 spectrophotometer. Photolyses were performed in copper two-way cells. Corning 7940 uv filter material (4 mm thick) was used to pass UV light, and $CaF_2$ windows allowed simultaneous monitoring of the disappearance of $CS_2$ with a Perkin-Elmer 180 infared spectrophotometer. No attempt was made to monitor products.

The $^{12}CS_2$ concentration was monitored through a 2.6-cm path length at 1531.1 cm$^{-1}$ ($\sigma_{ir} = 1.63 \times 10^{-16}$ cm$^2$) and the $^{13}CS_2$ at 1481.0 cm$^{-1}$ ($\sigma_{ir} = 1.31 \times 10^{-16}$ cm$^2$). These wavenumbers correspond to the collapsed and shifted $\nu_3$ rotation-vibration band in liquid argon (LAr) at $-170°$ C. Here the $\sigma$'s are the measured peak absorption cross sections at the wavenumbers quoted. All spectra were taken with a 1.5-s time constant at a scan speed of 0.15 cm$^{-1}$s$^{-1}$ with an instrumental resolution of 1.0 cm$^{-1}$. The maximum absorbance of the absorption features is about 1.5 cm$^{-1}$. Corresponding bands were used in LKr and LN$_2$.

The $^{12}CS_2$ (Matheson, Coleman and Bell) and $^{13}CS_2$ (Merck, Sharp and Dohme) samples were cooled to liquid nitrogen temperature, pumped on, and warmed several times for purification. Commercial, high-purity Ar, Kr, and N$_2$ were used without further purification.

Solutions were prepared by sweeping measured quantities of gaseous $CS_2$ into partially filled cells of liquefied solvent with the gaseous solvent. The cell was then completely filled by liquefying additional solvent gas while vigorously stirring the solution by means of a Teflon-coated magnetic stirrer. In order to have sufficient solubility of the $CS_2$ in LN$_2$, the cell was held at a temperature of $-165°$ C. and a pressure of <12,400 Torr.

The iodine resonance lamp was constructed from a section of 0.6 cm diameter ×0.1 cm wall quartz tubing which was evacuated and flamed with a torch to remove adsorbed gases. The tube was vented, several iodine crystals were added, the tube was reevacuated to $10^{-4}$ Torr, and the $I_2$ was distilled under vacuum several times between hot and cold sections of the tube to remove water and other impurities; the tube was then sealed. A Kiva Instrument Corp. microwave generator operated at 95 W of output power was coupled to an Evenson-type microwave cavity. The iodine resonance lamp provided approximately 30 mW of cw power at 206 nm. Other lines of longer wavelength were present but could not contribute to the photolysis since $CS_2$ does not absorb at these wavelengths. Therefore, the spectral output of the lamp was utilized without dispersion. The lamp ran continuously for hours with little attention, but the power output was found to vary with time. Photolyses were, therefore, performed with mixtures of $^{12}CS_2$ and $^{13}CS_2$ to ensure that identical light fluxes reached both types of molecules.

FIG. 1 shows the ultraviolet spectra of $^{12}CS_2$ and $^{13}CS_2$ dissolved in liquid nitrogen at $-165°$ C. The areas of the two curves are normalized to compensate for differences in the quantity of material in solution. Approximately $5 \times 10^{15}$ molecules/cm$^3$ were present in solution. $\sigma_{peak} \sim 2.5 \times 10^{-16}$ cm$^2$, which is very close to our measured gas-phase value for this quantity. The optical path length was 2.6 cm, and the spectral resolution was about 3 Å. The absorbance is defined to be log ($I_o/I$) where $I_o$ and $I$ are the incident and transmitted light intensity, respectively.

Figure 2:
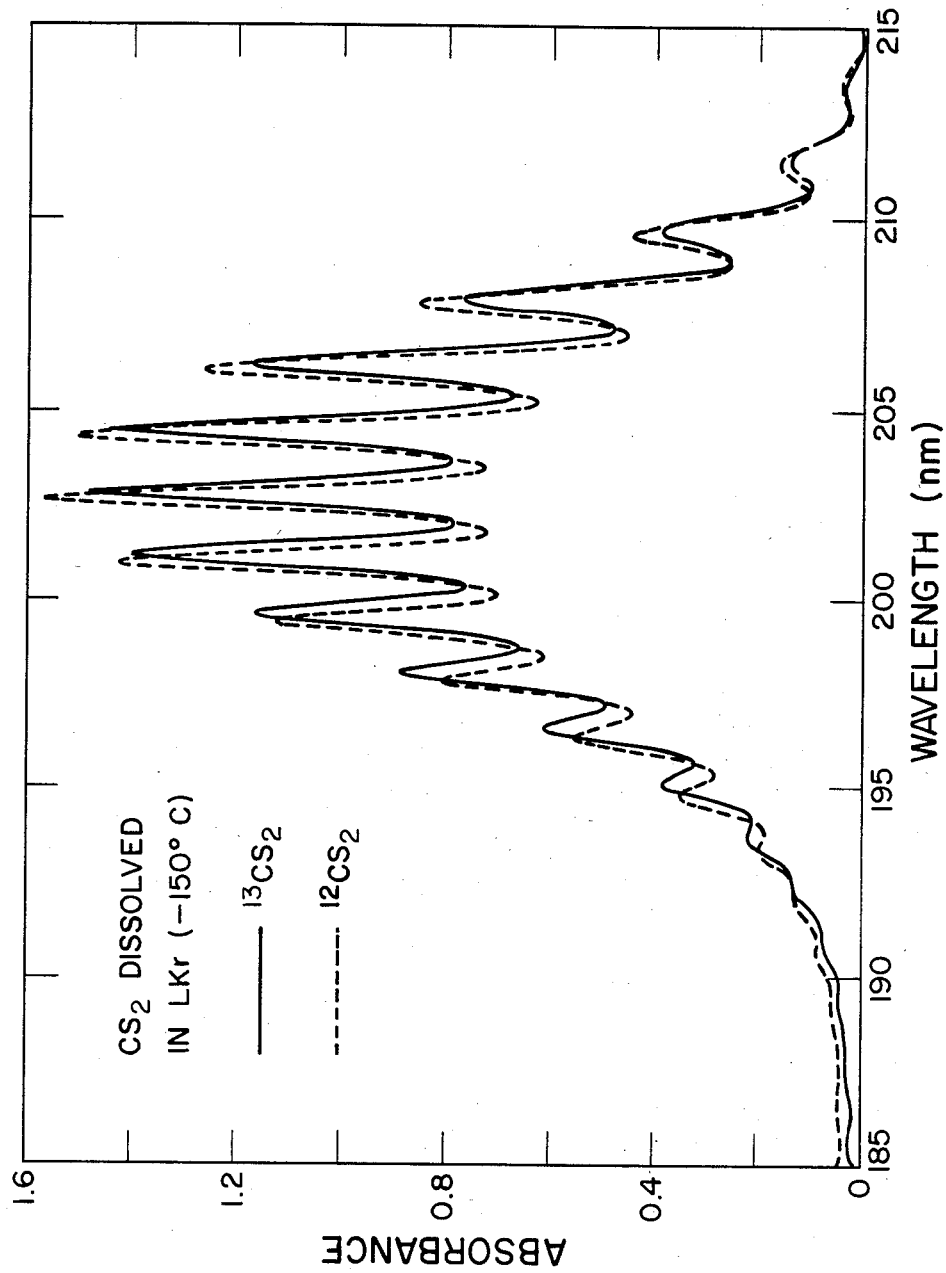
FIG. 2 shows curves of the ultraviolet spectra of $^{12}CS_2$ and $^{13}CS_2$ dissolved in liquid krypton at $-150°$ C.

FIG. 2, obtained under identical conditions, shows the ultraviolet spectra of $^{12}CS_2$ and $^{13}CS_2$ dissolved in liquid krypton at $-150°$ C. Note that these spectral absorptions, which are reported to arise from the $\tilde{A}^1B_2 \leftarrow \tilde{X}^1\Sigma_g^+$ transition, appear at longer wavelengths in LKr than they do in LN$_2$. Smaller shifts occur as a result of temperature changes. The isotopic shifts are apparent in both figures as well.

Figure 3:
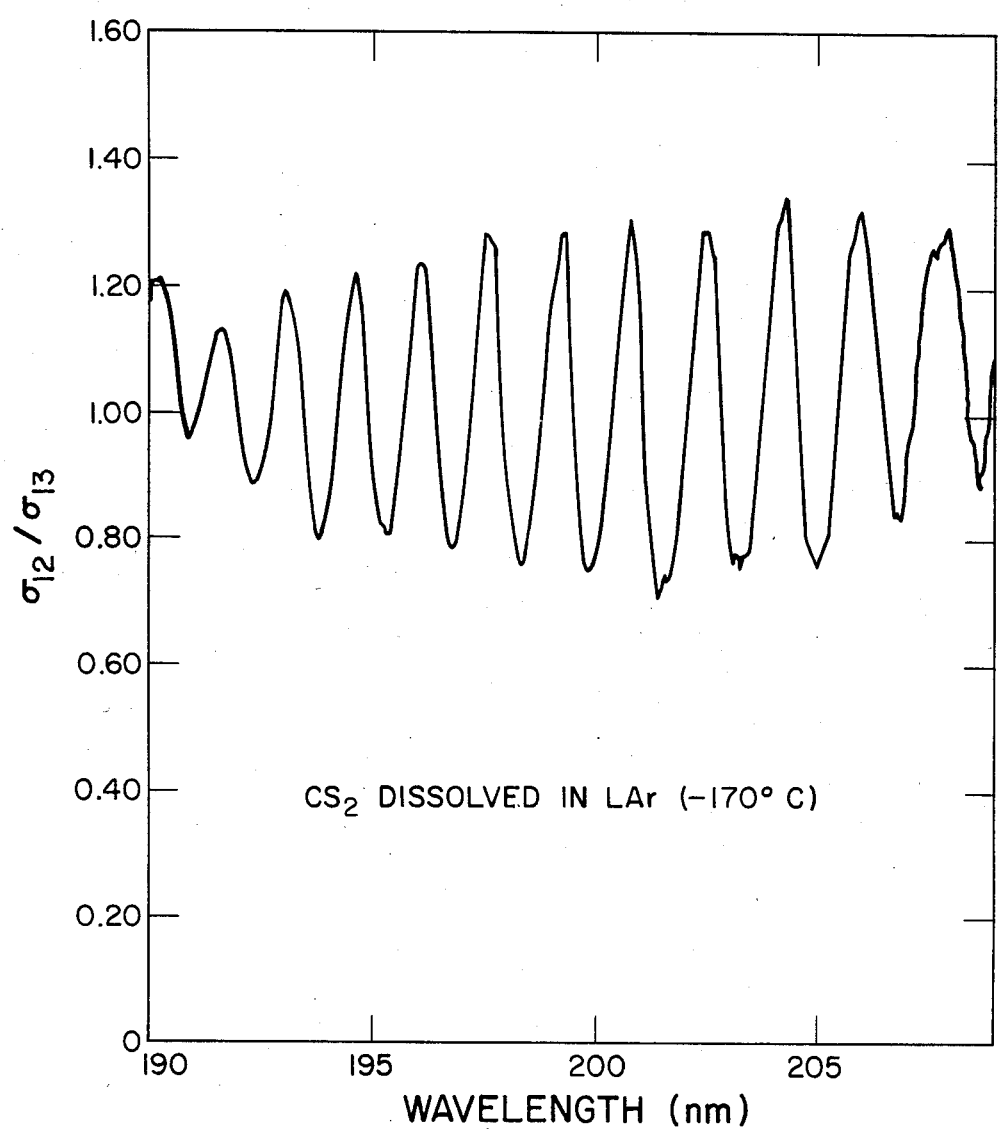
FIG. 3 shows a curve of the spectroscopic contrast ratio, $\sigma_{12}/\sigma_{13}$, for $^{12}CS_2$ and $^{13}CS_2$ in liquid argon at $-170°$ C. as a function of wavelength.

FIG. 3 shows the spectroscopic contrast ratio, $\sigma_{12}/\sigma_{13}$, for $CS_2$ in liquid argon at $-170°$ C. as a function of wavelength. Here the $\sigma$'s are measured absorption cross sections. Either $^{13}CS_2$ or $^{12}CS_2$ may be preferentially excited by choosing the appropriate wavelength for the photolyzing radiation.

Figure 4:
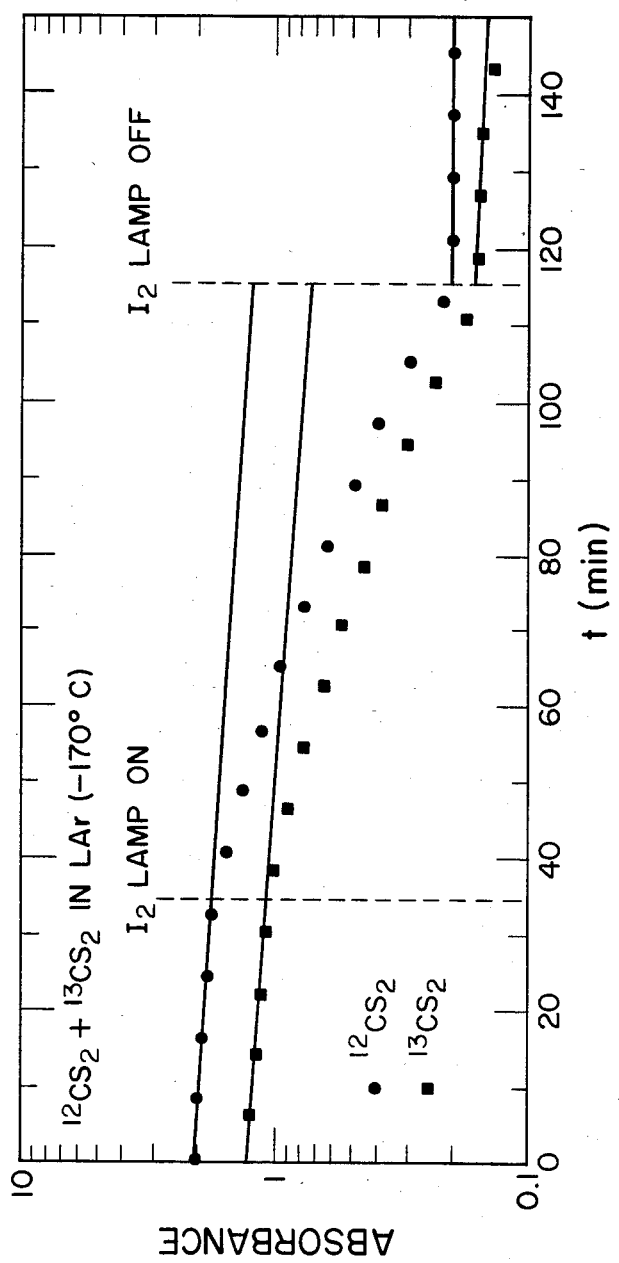
FIG. 4 shows the infrared absorbance [ln ($I_o/I$)] vs. time during photolysis for a mixture of $^{12}CS_2$ and $^{13}CS_2$ in liquid argon at $-170°$ C. at the peak absorbances of the 1531.1. $-C^{-1}$ and 1481.0-cm$^{-1}$ bands of $^{12}CS_2$ and $^{13}CS_2$, respectively. These are represented by O and □, respectively. The vertical dashed lines indicate times at which light from the iodine resonance lamp was admitted or excluded from the cell, and the solid curves are extrapolations of the slow decrease in $CS_2$ concentration that occurs where there is no photolyzing radiation.

The infrared absorbances [ln ($I_o/I$)] of $^{12}CS_2$ and $^{13}CS_2$ in liquid argon at $-170°$ C. are proportional to their concentrations and are plotted as functions of time in FIG. 4. Peak absorbances of the 1531.1. -CM$^{-1}$ and 1481.0-cm$^{-1}$ bands of $^{12}CM_2$ and $^{13}CS_2$, respectively, are represented by O and □, respectively. The vertical dashed lines indicate times at which light from the iodine resonance lamp was admitted or excluded from the cell, and the solid curves are extrapolations of the slow decrease in $CS_2$ concentration that occurs where there is no photolyzing radiation. As the $CS_2$ is photolyzed, the number of ultraviolet photons absorbed changes, and so the plot of absorbance vs. time is curved when the lamp is on. If isotopic scrambling reactions are unimportant and if the decomposition is unimolecular, then $k_i \propto \sigma_i$, where $\sigma_i$ is the ultraviolet absorption cross section and, $k_i$ is the rate of decomposition of $^iCS_2$ (1 = 12,13).

Table I gives the values of $k_{12}/k_{13}$ and of $\sigma_{12}/\sigma_{13}$ at 206 nm. The values of $k_{12}/k_{13}$ have been approximately corrected for the background disappearance of $CS_2$ in the absence of photolysis. The extended straight lines in FIG. 4 show this background decrease for one case. The background decrease is attributed to wall effects and is different runs, but it is equal for the two isotopic species. The estimated maximum uncertainly in $k_{12}/k_{13}$ is ±3%, so the results in Table I clearly indicate that photolytic enrichment of isotopically labeled $CS_2$ has occurred. In Table I, $\sigma_{12}/\sigma_{13}$ is seen to be 7-10% different than $k_{12}/k_{13}$. Since we estimate that $\sigma_{12}/\sigma_{13}$ is known within ±5%, the measured values of $k_{12}/k_{13}$ are not quite within experimental error of $\sigma_{12}/\sigma_{13}$. The differences could be caused by isotopic scrambling reactions, by unrecognized systematic error in $\sigma_{12}/\sigma_{13}$, by differences in quantum efficiency for $^{13}CS_2$ and $^{12}CS_2$, or by nonselective, photolyzing continuum radiation from the iodine lamp.

TABLE I

Spectroscopic Contrast Ratios[a] at 206 nm and Observed Ratios of Rates of Photolysis

| solvent[b] | temp, °C. | $k_{12}/k_{13}$ | $\sigma_{12}/\sigma_{13}$ | $\Delta^c$ % | % photolyzed $^{12}CS_2$ | % photolyzed $^{13}CS_2$ | photolysis[d] time, s |
|---|---|---|---|---|---|---|---|
| LAr | −170 | 1.22 | 1.32 | 8 | 83 | 77 | 4846 |
| LKr | −150 | 1.10 | 1.18 | 7 | 52 | 49 | 3915 |
| LN$_2$ | −165 | 0.94 | 0.85 | 10[e] | 70 | 72 | 678 |

[a]Contrast ratio is defined as the ratio of cross sections, $\sigma_{12}/\sigma_{13}$, at a single wavelength.
[b]Approximately $5 \times 10^{16}$ molecules/cm$^3$ of each of $^{12}CS_2$ and $^{13}CS_2$ were dissolved in LAr and LKr and $1 \times 10^{16}$ molecules/cm$^3$ in LN$_2$.
[c]$\Delta$ is the percentage difference between $\sigma_{12}/\sigma_{13}$ and $k_{12}/k_{13}$. $\Delta = 100 \, (\sigma_{12}/\sigma_{13} - k_{12}/k_{13}) / (\sigma_{12}/\sigma_{13})$.
[d]Photolysis times varied dramatically depending on the condition of the resonance lamp. New lamps enabled short irradiation times because of increased light flux.
[e]Here $\Delta$ is the percentage difference between $\sigma_{13}/\sigma_{12}$ and $k_{13}/k_{12}$.

(If such continuum radiation had totaled >5% of the 206-nm radiation, we would have detected it, however.) Although the poor light utilization efficiency does not augur well for an economical carbon isotope enrichment process as the subject process presently stands, investigation of possible scavengers and/or other solvents may improve this. However, the importance of the subject invention is in its general applicability in overcoming the fact that efficient, intense, conventional light sources are not significantly tunable in wavelength. Therefore, if there is no coincidence between the lamp output (wavelength) and the absorption of the molecule bearing the isotopic species to be separated, a photolytic separation will not be possible unless another isotopic form of the same molecule absorbs at this wavelength. Utilization of the solvent shift technique then may allow the coincidence criterion to be met for at least one isotopic species with a suitable choice of solvent. A similar difficulty exists with laser sources. Tunable laser sources are generally low intensity devices with inherent difficulties in controlling the spectral width and position accurately. Fixed wavelength sources such as rare gas-halogen lasers or ion lasers on the other hand, are very efficient, monochromatic and narrow-banded sources, and would consequently be more easily used for photolysis experiments if the usual lack of coincidence between laser output and molecular absorption could be compensated for by solvent shift in a given case.

Figure 5:
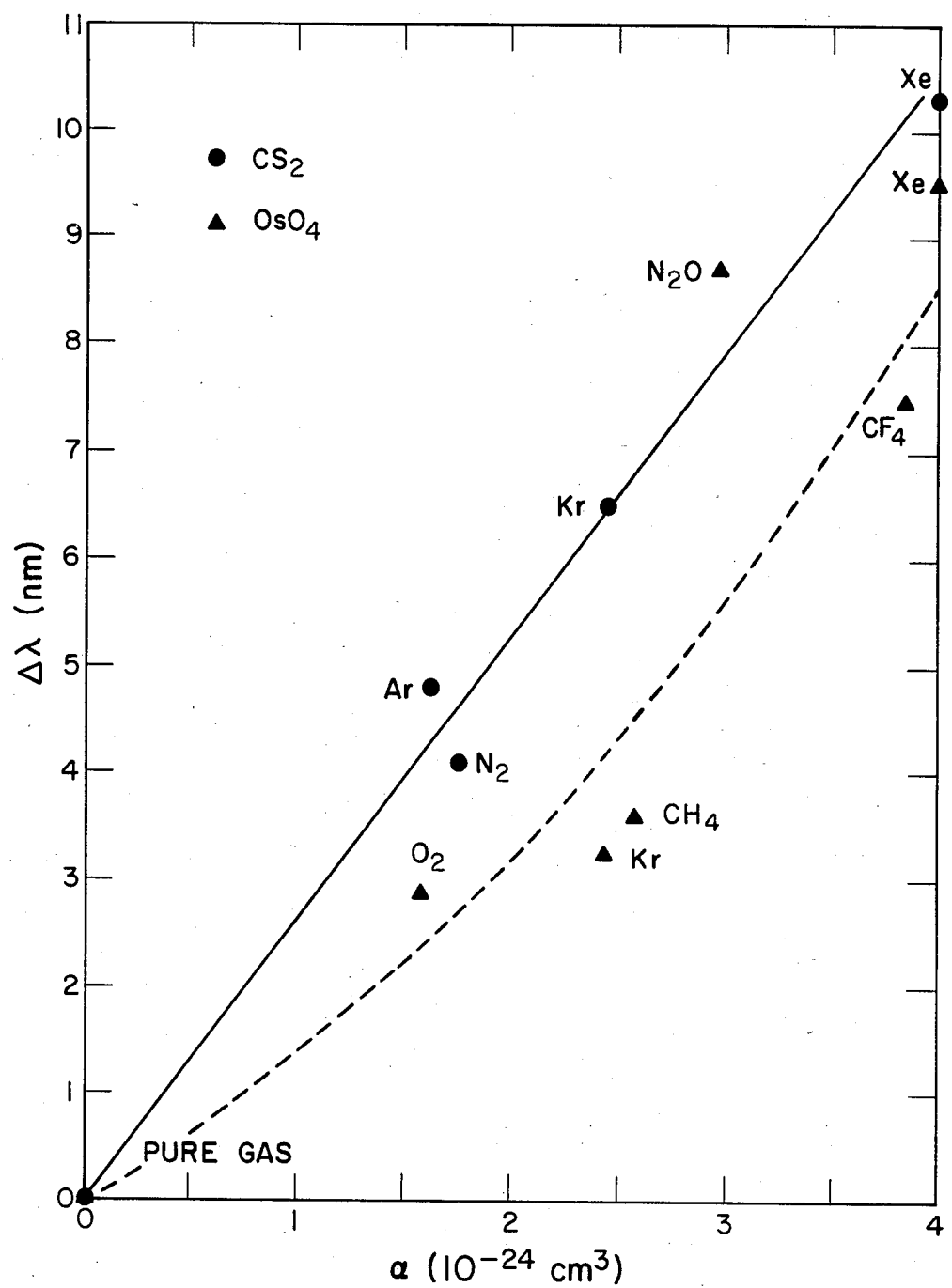
FIG. 5 shows the shift in ultraviolet absorption wavelength of $CS_2$ (O) and $OsO_4$ (Δ) relative to the pure gases as a function of cryogenic solvent polarizability.

FIG. 5 shows the wavelength shifts for $CS_2$ (O) and $OsO_4$ ($\Delta$) ultraviolet molecular absorption features relative to the pure gases as a function of cryogenic solvent polarizability. Of note is that for $CS_2$ the relationship is approximately linear, making "fine tuning" of the molecular absorption features by selection of cryogenic solvent a remarkably simple procedure. The curvature observed for the $OsO_4$ is not understood at present, but the well-defined, monotonic behavior of the effect shows that the solvent shift method is generalizable to other systems and readily applied with accurate predictions possible once a particular solvent's polarizability is known by utilizing experimentally obtained curves such as those of FIG. 5. The shift for $N_2O$ as a solvent is very far off the curve presumably because it is polar, unlike the other solvents. Further, although the spectra used for these curves were obtained at different temperatures (depending on the solvent), the effect on the shifts from the vapor-phase absorption wavelengths is very much smaller than that arising from the solvents themselves and has been neglected.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

What is claimed is:

1. A process for seperating isotopes, which comprises the steps of: (a) forming a solution of carbon disulfide in a solvent selected from the group consisting of liquefied nitrogen, krypton, argon, and mixtures thereof at a temperature such that the absorption spectrum of said carbon disulfide is sufficiently well-defined that the spectroscopic features corresponding to the different isotopes of the element can be distinguished, and few interfering solvent absorptions occur, (b) irradiating said solution with monochromatic radiation selected from wavelengths included in the visible and ultraviolet regions of the electromagnetic spectrum which selectively, or at least preferentially, dissociates those molecules of said carbon disulfide containing one of the desired isotopes of the element forming at least one dissociation product containing said desired isotope of the element, said monochromatic radiation being supplied from a radiation source emitting near a dissociative spectroscopic feature of said desired isotope containing carbon disulfide molecules in their gaseous for, the requisite coincidence between said monochromatic radiation and said dissociative spectroscopic feature to achieve said preferential dissociation being obtained by choosing the appropriate solvent, said solvent causing a displacement of said dissociative spectroscopic feature, and (c) subjecting said at least one dissociation product containing said desired isotope of the element to physical or chemical processes or a combination thereof, whereby said desired isotope contained in said at least one dissociation product is separated from other isotopes of the same element contained in the undissociated molecules of said carbon disulfide in said solution.

2. The process as described in claim 1, wherein said monochromatic radiation is provided by emission from an iodine resonance lamp.

* * * * *